United States Patent
Akers et al.

(10) Patent No.: US 6,238,496 B1
(45) Date of Patent: May 29, 2001

(54) METHOD FOR PRECISION MODIFICATION AND ENHANCEMENT OF SHAPE MEMORY ALLOY PROPERTIES

(76) Inventors: Jeffrey W. Akers, 1411 Anthony St., Columbia, MO (US) 65201; James Michael Zerkus, 2437 Bay Area Blvd., Suite 234, Houston, TX (US) 77058

(*) Notice: Subject to any disclaimer, the term of this patent is extended or adjusted under 35 U.S.C. 154(b) by 0 days.

(21) Appl. No.: 09/345,697

(22) Filed: Jun. 30, 1999

Related U.S. Application Data

(60) Provisional application No. 60/091,465, filed on Jul. 1, 1998.

(51) Int. Cl.[7] .............................. C22C 27/06; C21D 1/54
(52) U.S. Cl. ......................... 148/508; 148/537; 148/563; 148/402
(58) Field of Search ................................ 148/508, 516, 148/518, 537, 563, 402

(56) References Cited

U.S. PATENT DOCUMENTS

| | | | |
|---|---|---|---|
| 4,518,444 | * | 5/1985 | Albrecht et al. ................ 148/402 |
| 4,759,906 | * | 7/1988 | Nenno et al. ................... 148/463 |
| 5,641,364 | * | 6/1997 | Golberg et al. ................. 148/402 |

* cited by examiner

*Primary Examiner*—Scott Kastler
(74) *Attorney, Agent, or Firm*—Kenneth A. Robby

(57) ABSTRACT

A method for post-production precision modification and enhancement of pre-existing shape memory alloy (SMA) forms to precisely alter their chemical composition and properties and produce greater accuracy and versatility. The present process includes carefully controlled electrodeposition or electroless deposition of alloying agents such as Nickel, Copper, or other elements on the surface of the pre-existing SMA form to produce the desired shape memory properties, followed by application of a protective coating, then high temperature heat treatment in combination with gentle physical kneading to speed up the homogenization process (thermal diffusion) and produce rapid diffusion of the plated metal throughout the form. The present method may also use the skin effect of AC current for localized heat treatment of the SMA form and neutron activation tracer analysis for in-line quality control and diagnostics. The process can also be used to impart shape memory properties to non-SMA alloy forms. Another aspect of the invention is an article of manufacture produced by the process.

14 Claims, 3 Drawing Sheets

US 6,238,496 B1

METHOD FOR PRECISION MODIFICATION AND ENHANCEMENT OF SHAPE MEMORY ALLOY PROPERTIES

CROSS REFERENCE TO RELATED APPLICATION

This application claims priority of U.S. Provisional Application Ser. No. 60/091,465, filed Jul. 1, 1998.

BACKGROUND OF THE INVENTION

1. Field of the Invention

This invention relates generally to shape memory alloys (SMAs), and more particularly to a method for post-production precision modification and enhancement of pre-existing shape memory alloy (SMA) forms to precisely alter their chemical composition and properties and produce greater accuracy and versatility. The process can also be used to impart shape memory properties to non-SMA alloy forms.

2. Brief Description of the Prior Art

Shape memory alloy (SMA) materials undergo a reversible phase transformation in their crystal structure when heated from a low temperature form to a high temperature form. Transformation temperatures can be accurately set between −200° C. to 200° C. by varying the composition of the alloy and annealing procedure when forming the shape memory alloy wire. Suitable shape memory alloy materials include, but are not limited to: Ag—Cd, Au—Cd, Cu—Al—Ni, Cu—Sn, In—Ti, Ni—Al, Ni—Ti, Ni—Te—Fe, Ni—Ti—V, Ni—Ti—Al, Fe—Mn—Si, Cu—Zn—Al, U—Ni, U—Mo and U—Nb.

The terms used herein are meant to have the following meanings. The "austenitic start temperature" ($A_s$ temperature) is the temperature at which a shape memory alloy starts transforming to austenite upon heating. The "austenitic finish temperature" ($A_f$ temperature) is the temperature at which a shape memory alloy finishes transforming to austenite upon heating. "Austenite" is the higher temperature phase present in Ni—Ti, for example.

The "martensitic start temperature" ($M_s$ temperature) is the temperature at which a shape memory alloy starts transforming to martensite upon cooling. The "martensitic finish temperature" ($M_f$ temperature) is the temperature at which a shape memory alloy finishes transforming to martensite upon cooling. "Martensite" is the more deformable, lower temperature phase present in Ni—Ti, for example. "Hysteresis" is the temperature difference between a phase transformation upon heating and cooling. "Shape memory" is the ability of certain alloys to return to a predetermined shape upon heating via a phase transformation. "Superelasticity" is the springy, "elastic" behavior present in shape memory alloys, such as Ni—Ti, at temperatures just above the $A_f$ temperature. The superelasticity arises from the formation and reversion of stress-induced martensite.

Upon heating or cooling, shape memory alloys do not completely undergo their phase transformation at one particular temperature. Instead, the transformation begins at one temperature (known as the start temperature) and is completed at another temperature (known as the finish temperature). Further, there is a difference in the transformation temperatures upon heating from the first phase to the second phase (martensite to austenite for example in Ni—Ti) and cooling from the second phase to the first (austenite to martensite), resulting in a delay or "lag" in the transformation. This difference is known as the transformation temperature hysteresis. The transformation temperature hysteresis can also be effected by alloying, cold working, and heat treatment.

Shape memory alloy (SMA) and the shape memory effect (SME) were initially defined by the NASA report NASA-SP 5110. The shape memory effect (SME) is observed in alloys, which exhibit a thermoelastic martensite transformation. Martensitic transformations are responsible for the hardening that occurs when steel is quenched from an elevated temperature. Unlike martensite in steel, the thermoelastic martensite in shape memory alloys, after being formed by quenching from an elevated temperature, will then appear and disappear upon subsequent heating and cooling over a small temperature range.

Typically, the conventional method of creating the shape memory effect (SME) is to heat a specimen to an elevated temperature followed by a rapid quench. Since the change in crystalline structure is diffusionless, the martensite structure appears spontaneously. If the specimen is deformed within the recoverable strain limit and then heated above its transformation temperature ($A_s$), an orderly transformation of martensite groups causes the specimen to recover its original unstrained shape (remembered shape). Total recovery of the remembered shape occurs at the $A_f$ temperature (after sufficient heat has been absorbed) which is greater than the $A_s$ temperature. For example, the transformation temperature can be set between −200° C. to 200° C. by varying the composition of the alloy and annealing procedure.

The shape memory properties of Shape Memory Alloys (SMAs) are extremely sensitive to very slight changes in their chemical composition. A change of 1% nickel in NITNOL (Nickel/Titanium SMA) can result in 80° C. difference, or more, in the transition temperatures ($A_s$ or $A_f$ or $M_s$ or $M_f$) of the alloy.

Common metallurgical techniques are limited to the accuracy of measurement, purity of the raw materials, and the nature of preparation method. If the industry had to rely solely on the conventional prior art production techniques, the obtainable accuracy of the austenitic start temperature $A_s$ and austenitic finish temperature $A_f$ could be as poor as plus or minus 15° C. for significant quantities of SMA.

Conventional augmentary techniques such as cold working and adjusting the conditions of the memory imparting process have been used to adjust the transition temperatures to a finer degree but are limited and complex.

There are several patents that disclose various methods for producing shape memory alloys having various physical properties.

Goldstein et al, U.S. Pat. No. 4,283,233 discloses a method of changing the shape change transition temperature range (TTR) of an object made from a nickel-titanium based shape change memory alloy by selection of the final annealing temperature. In this method pre-existing shape memory alloy powder is blended with other alloy powders or elemental powders, compacted, and diffused to form SMA having a predetermined transition temperature range.

Fountain et al, U.S. Pat. No. 4,310,354 discloses a process for producing a shape memory effect alloy having a desired transition temperature utilizing at least one prealloyed shape memory effect alloy powder having a chemistry similar to that of the to be produced alloy and a transition temperature below the desired transition temperature of the to be produced alloy; and at least one other prealloyed shape memory effect alloy powder having a chemistry similar to that of the to be produced alloy and a transition temperature in excess of the desired transition temperature of the to be produced alloy. The prealloyed powders are blended, consolidated, and thermally diffused to provide a substantially homogeneous alloy of the desired transition temperature.

In finished TiNi SMA forms made with the powder metallurgy method wherein Ti powder and Ni powder are mixed at suitable range and are sintered by heat treating diffusion; because the powder has a large surface area and the oxide layer formed at the surface of the Ti powder (which is apt to oxidize), the finished product can have voids which may cause variations in transformation temperature, and the diminution of strength and life.

Ishibe, U.S. Pat. No. 4,830,262 discloses a method of making titanium-nickel alloys (TiNi) having a homogeneous composition by consolidation of compound material. The process includes forming a composite by providing in a sheathing container plural pieces of compound wire having Ti lineal wire made of Ti material and Ni material made to contact at least a portion of the surface of the Ti lineal wire. The composite is then subject to dimension-reduction, after which diffusion is effected to cause the production of a TiNi phase. The composite is removed from the sheathing container and cold-worked.

Thoma et al, U.S. Pat. No. 4,881,981 discloses a process for adjusting the physical and mechanical properties during formation of a shape memory alloy member of a known chemical composition by increasing the internal stress level and forming the member to a desired configuration and then heat treating the member at a selected memory imparting temperature.

Ebato et al, U.S. Pat. No. 5,316,599 discloses a method of producing Ni—Ti intermetallic compounds by subjecting a laminate of Ni foils and Ti foils to a rolling for thickness adjustment and then to a diffusion heat treatment at multi-stages within a particular temperature range for a particular time. In this method the compounds are produced by alternately laminating plural Ni foils and Ti foils one upon the other, rolling the resulting laminate to a final product thickness and then subjecting it to a heat treatment to form a Ni—Ti intermetallic compound having Ni content of 48–55 atomic %.

Shiba et al, U.S. Pat. No. 4,659,437 discloses a method of thermal diffusion alloy plating for steel wire (not shape memory alloy) wherein the quantity of metal plated, plated metal composition, plating composition gradient or combination thereof, is continuously detected by an energy dispersive type X-ray fluorescent analyzer. Upon detecting any variation in these values, a control signal is given to a control unit to automatically adjust the plating electric current and the diffusion heating quantity to impart the desired quantity of metal plated, the desired plated alloy composition ratio, and the desired plating composition gradient uniformly in the lengthwise direction of the steel wire.

The present invention is distinguished over the prior art in general, and these patents in particular by a method for post-production precision modification and enhancement of pre-existing shape memory alloy (SMA) forms to precisely alter their chemical composition and properties and produce greater accuracy and versatility. The present process includes carefully controlled electrodeposition or electroless deposition of alloying agents such as nickel, copper, or other elements on the surface of the pre-existing SMA form to produce the desired shape memory properties, followed by application of a protective coating, then high temperature heat treatment in combination with gentle physical kneading to speed up the homogenization process (thermal diffusion) and produce rapid diffusion of the plated metal throughout the form. The present method may also use the skin effect of AC current for localized heat treatment of the SMA form and neutron activation tracer analysis for in-line quality control and diagnostics. The process can also be used to impart shape memory properties to non-SMA alloy forms. Another aspect of the invention is an article of manufacture produced by the process.

The present method and process offers a significant improvement in the ability to adjust the chemical composition of pre-existing shape memory alloy (SMA) forms (wire, rod, sheet, ribbon etc.), more accurate customization of the shape memory properties of an SMA in small lots, and allows reduction in the types of SMAs having different physical properties that a manufacture would have to maintain in inventory.

SUMMARY OF THE INVENTION

It is therefore an object of the present invention to provide a method for precision modification and enhancement of pre-existing shape memory alloy (SMA) forms, such as wire, rod, sheet, ribbon etc., to precisely alter their chemical composition and properties.

It is another object of this invention to provide a method for precision modification and enhancement of pre-existing shape memory alloy (SMA) forms or non-SMA alloy forms, such as wire, rod, sheet, ribbon etc., which allows precise and customized control of the shape memory properties as well as chemical and metallurgical properties in general.

Another object of this invention is to provide a method for precision modification and enhancement of pre-existing shape memory alloy (SMA) forms which will allow gross post-production modification and customization of shape memory alloy forms currently in stock and significantly reduce inventory requirements for the types of SMAs having different physical properties that a manufacture would have to maintain.

Another object of this invention is to provide a method for precision modification and enhancement of pre-existing shape memory alloy (SMA) forms, such as wire, rod, sheet, ribbon etc., which includes carefully controlled electrodeposition or electroless deposition of alloying agents such as nickel, copper, or other elements on the surface of the pre-existing SMA form to produce the desired shape memory properties.

Another object of this invention is to provide a method for precision modification and enhancement of pre-existing shape memory alloy (SMA) forms or non-SMA alloy forms, such as wire, rod, sheet, ribbon etc., wherein the pre-existing form is subjected to high temperature heat treatment in combination with gentle physical kneading to speed up the homogenization process (thermal diffusion) and produce rapid diffusion of the plated metal throughout the form.

A further object of this invention is to provide a method for precision modification and enhancement of pre-existing shape memory alloy (SMA) forms, such as wire, rod, sheet, ribbon etc., wherein the skin effect of AC current is utilized for localized heat treatment of the SMA form and neutron activation tracer analysis for in-line quality control and diagnostics.

A still further object is to provide shape memory alloy articles of manufacture produced by the present method, Other objects of the invention will become apparent from time to time throughout the specification and claims as hereinafter related.

The above noted objects and other objects of the invention are accomplished by a method for post-production precision modification and enhancement of pre-existing shape memory alloy (SMA) forms to precisely alter their chemical composition and properties and produce greater accuracy and versatility. The present process includes carefully controlled electrodeposition or electroless deposition of alloying agents such as nickel, copper, or other elements on the surface of the pre-existing SMA form to produce the desired shape memory properties, followed by application of a protective coating, then high temperature heat treatment in combination with gentle physical kneading to speed up the homogenization process (thermal diffusion) and produce rapid diffusion of the plated metal throughout the form. The present method may also use the skin effect of AC current for localized heat treatment of the SMA form and neutron activation tracer analysis for in-line quality control and diagnostics. The process can also be used to impart shape memory properties to non-SMA alloy forms.

DESCRIPTION OF THE PREFERRED EMBODIMENT

Figure 1:
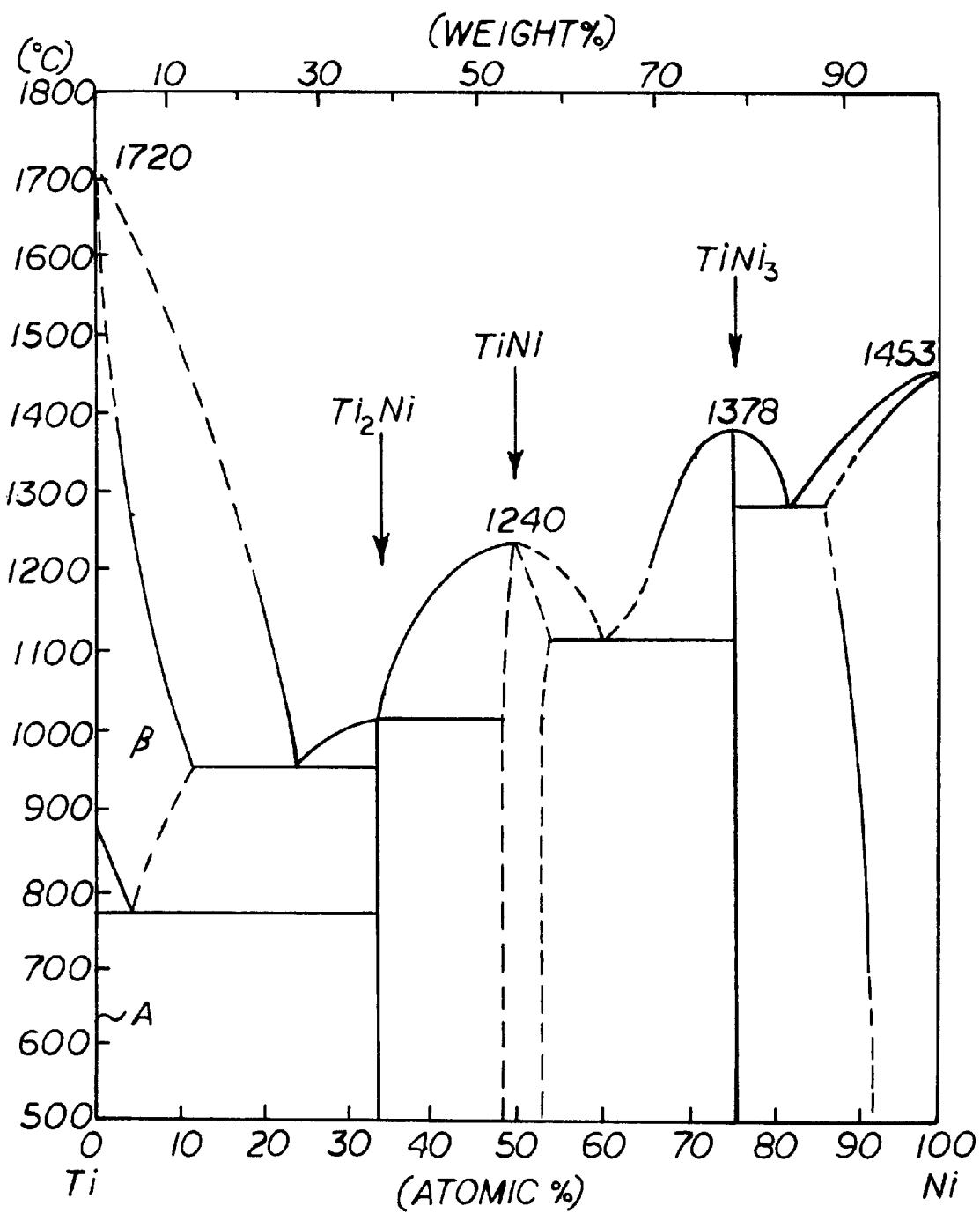
FIG. 1 is a phase diagram of Nickel Titanium alloys.

In the following discussion the method in accordance with the present invention is described using Nickel Titanium (NiTi) based alloys as an example, but it should be understood that the present method is applicable to all SMAs in general. Referring to the drawings by numerals of reference, there is shown in FIG. 1, a phase diagram for Nickel Titanium alloys. It can be seen that between TiNi and $TiNi_3$ inter-metallic compounds there is a liquid phase (from greater than 50 atomic % to approximately 67 atomic percent % Ni) at 1230° C. This liquid phase varies in accordance with the Nickel content and exists all the way down to 1120° C. at a Ni content of approximately 58 atomic %. If the precipitation of a $TiNi_3$ solid phase could be reduced or avoided between the nickel plate (Ni is the alloying agent) and the NiTi core, a stable liquid phase could be established at the interface and allow very rapid diffusion and homogenization.

Figure 2:
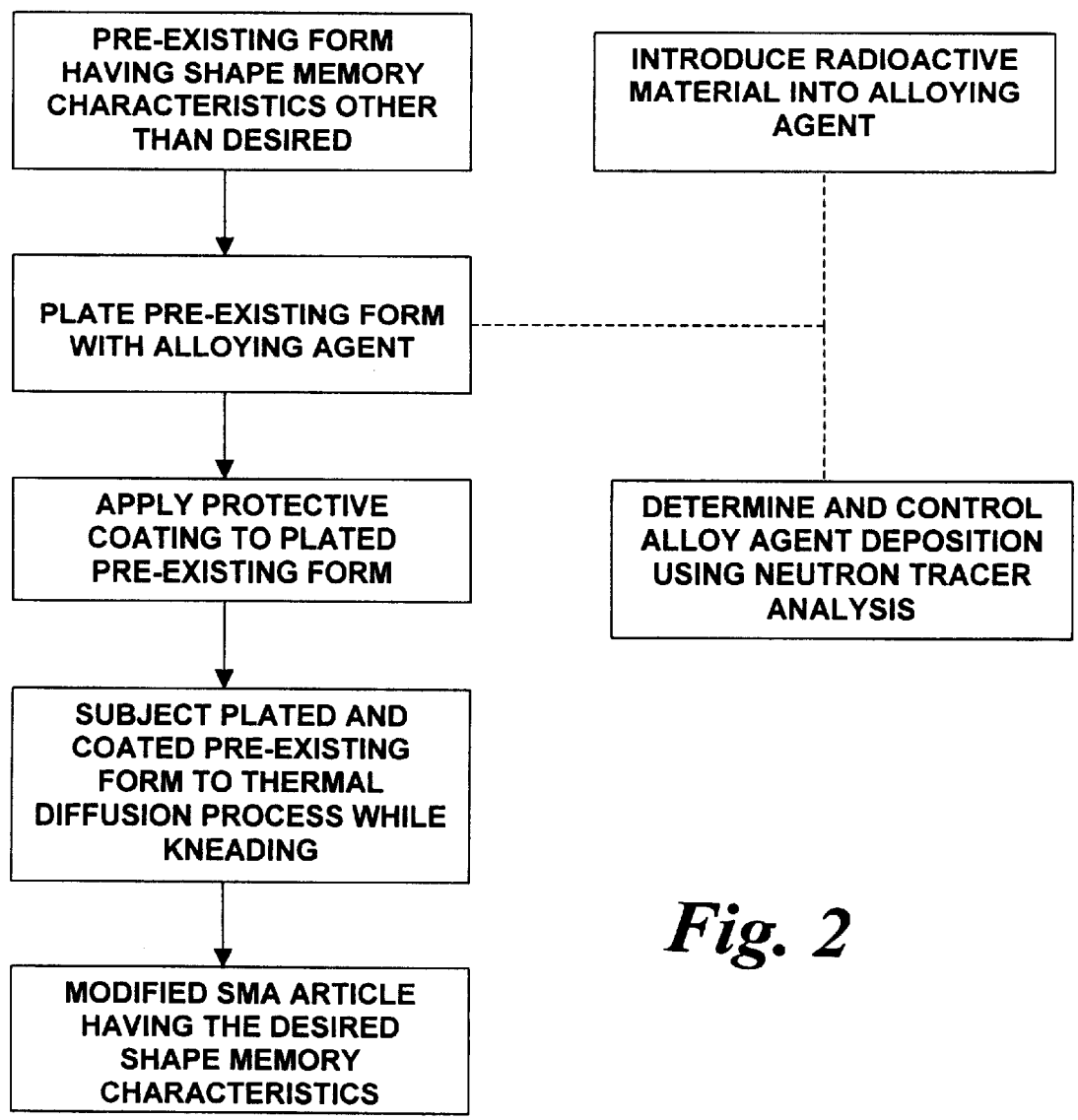
FIG. 2 is a flow diagram of the steps in the properties enhancement process in accordance with the present invention.

Referring now to FIG. 2, the steps involved in the properties enhancement method and process in accordance with the present invention are illustrated by a flow diagram. It should be understood that the present method does not produce an original SMA form, but instead is a post-production process that alters the chemical composition of pre-existing shape memory alloy (SMA) forms, such as such as wire, rod, sheet, ribbon etc., which have been produced by any of the convention SMA production methods, and which may have transition temperatures other than desired.

The surface of the pre-existing shape memory alloy (SMA) form (wire, rod, sheet, ribbon etc.) to be modified is subjected to carefully controlled electrodeposition or electroless deposition plating with an even coating of a precise amount of a selected alloying agent or agents such as nickel, copper, or other elements, to produce the desired shape memory properties.

The following elements and combinations thereof are suitable for use as alloying agents for producing shape memory effects; nickel, copper, titanium, silver, cadmium, gold, aluminum, tin, indium, iron, manganese, silicon, zinc, vanadium, molybdenum, niobium, rhenium, and uranium.

After the surface of the base SMA form has been plated with the selected alloying agent(s), a protective coating is applied to prevent corrosion and contamination and undesirable diffusion at high temperatures. The protective coating preferably includes rhenium and a platinum metal such as platinum, palladium, iridium, rhodium, ruthenium, with or with out the presence of gold.

Figure 3:
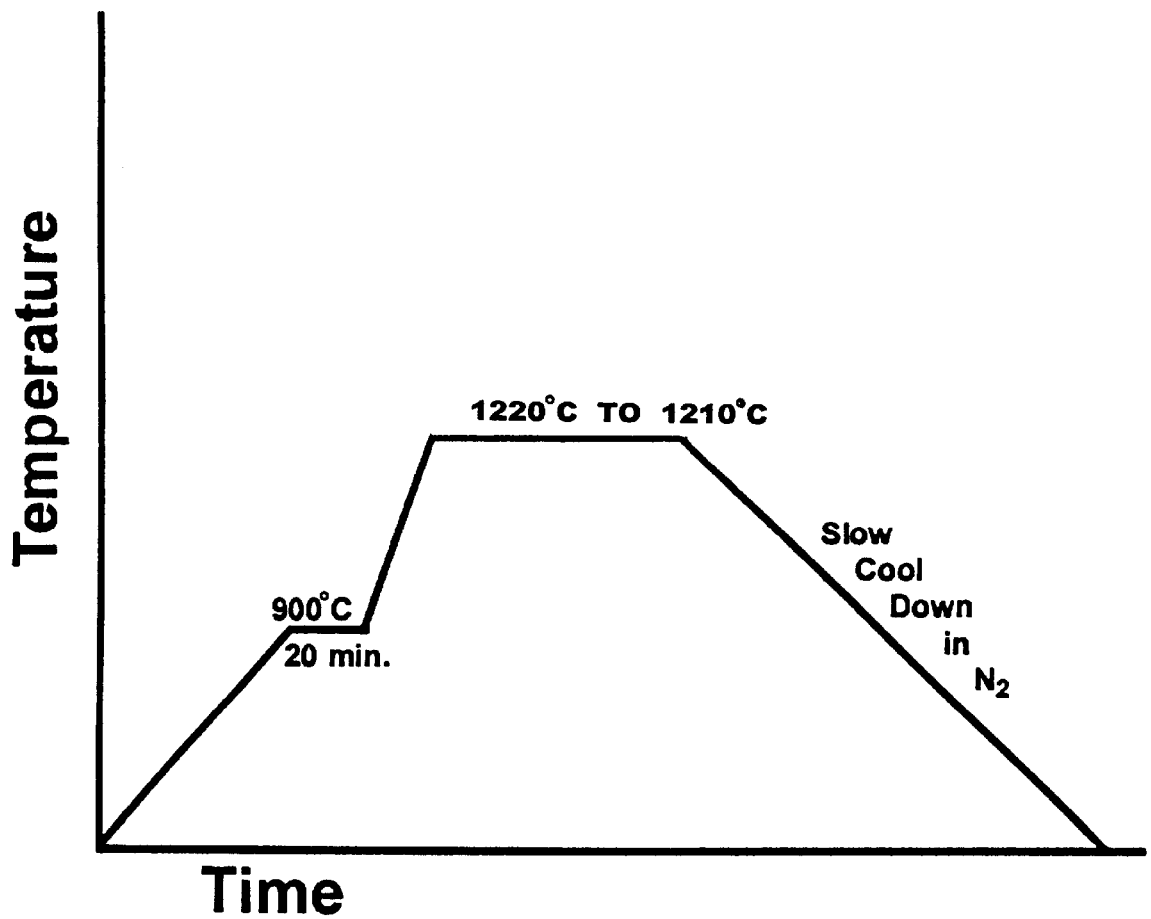
FIG. 3 is a sample heat treatment graph for a binary Nickel Titanium (NiTi) alloy.

After the protective coating has been applied, the plated and coated SMA form is subjected to a thermal diffusion process. Referring additionally to FIG. 3, in the diffusion process, the diffusion treatment temperature gradient starts at slightly above the melting point of the final desired alloy (most of the desirable alloys fall in between about 55 and 56 wt % Ni) and ends slightly below that melting point.

During the thermal diffusion treatment, the form is constantly kneaded to speed up the homogenization process (thermal diffusion) and produce rapid diffusion of the plated alloying agent(s) throughout the form. Kneading, as defined herein, is repeated minor deformation of the form in a rhythmic fashion. This results in a degree of mixing occurring in the liquid phase, which distributes the Ni content and reduces the amount of precipitated $TiNi_3$ solid to the point to where there is a stable liquid phase at the interface through out the diffusion process. Physical kneading may be performed by a series of insulated or heated rollers on the resistance heated SMA form. Another method of kneading is to contort the form using an AC or DC electromagnetic field. The combined thermal diffusion treatment accompanied by continuous physical kneading significantly speeds up reactive diffusion and will eliminate Kirkendall voids, improve homogenization and reduce stress in the form.

Neutron activation tracer analysis is used as a diagnostic and quality control tool during the process. This may be accomplished in a closed loop computerized control system wherein a reservoir of a dilute aqueous radioisotope parent solution is exposed to an uninterrupted uniform neutron flux for an sufficient amount of time to cause the activity of the daughter radioisotope (disintegration product of the parent isotope) to remain substantially constant (secular equilibrium) and the reservoir is tapped with a metered pump to replenish the daughter radioisotope in the plating bath. The specific activity and total metal content of the plating bath is monitored. Since the elapsed time from plating and the daughter radioisotope is known and the daughter radioisotope is in a known ratio with the stable metal content (alloying agent) at the time of plating, the activity plated on the form can be related to the total metal plated on the form using spectroscopy.

By incorporating a small known amount of short lived radioactive material into the plating solutions it is possible to determine very accurately the amount of metal plated out of those solutions. For example, in a nickel plating solution small amounts of Ni-65 could be continuously added to maintain a certain specific activity of this radioisotope in the plating solution through out plating operations. Since the amount of Ni-65 constantly present and its relationship to the stable isotopes of Nickel present in the solution are known, it is apparent that the Nickel metal plated out of the plating solution will consist of the same ratio of radioactive and stable isotopes. Another example would be utilizing Cu-64 in conjunction with depositing copper.

Utilizing conventional Gamma or Beta spectroscopy equipment, and knowing the half-life of Ni-65 and the time interval since the form was plated, a very precise value for the mass of nickel plated on the SMA form can be ascertained. A convenient method of maintaining the desired specific activity of the plating solution is to expose a reservoir of very dilute aqueous Ni-64 nitrate solution to the neutron flux of a small Cf-252 source. After about 17.64 hours the specific activity of the Ni-65 will remain for all practical purposes constant. By taping this reservoir with a metered pump to replenish the plating solution, monitoring the plating solution's specific activity and controlling the replenishment activity by computer a very precise control can be maintained. This same technique can be used for many other alloying agents, including but not limited to copper, vanadium and rhenium.

Having described the present method, the following is an example that illustrates its utility in the marketplace. Assume that a manufacturer of shape memory alloy wire receives an order for 10 meters of 1 mm diameter NITNOL wire with an austenitic start temperature ($A_s$ temperature) of 22° C. With the present state of the art, the manufacturer would have only two choices; if available, similar SMA wire in stock (with a $A_s$ within a few degrees of the requested $A_s$) could be adjusted by altering the conditions of the shape memory heat treatment process, and perform some cold work on it, or the manufacturer would have to make a special 150+ pound melt and charge the customer. However, if the present process were used, the manufacturer could custom modify 10 meters of wire from any available higher temperature wire in stock or on-hand. The resulting wire, altered and enhanced by the present process, would have more precise transition temperature tolerances.

While this invention has been described fully and completely with special emphasis upon a preferred embodiment, it should be understood that within the scope of the appended claims the invention may be practiced otherwise than as specifically described herein.

What is claimed is:

1. A post-production method for modification and enhancement of pre-existing shape memory alloy (SMA) forms to precisely alter their chemical composition and produce desired shape memory characteristics, comprising the steps of:
   plating the surface of a pre-existing shape memory alloy (SMA) form with a precise amount of a selected alloying agent to produce a desired shape memory characteristic;
   applying a protective coating on the plated form to prevent corrosion and contamination and undesirable diffusion at high temperatures; and thereafter
   subjecting the plated and coated form to a temperature gradient ranging from slightly above the melting point of an alloy having the desired shape memory characteristic to slightly below said melting point to produce a liquid phase and diffuse the plated alloying agent throughout the form.

2. The method according to claim 1, wherein said alloying agent is selected from the group consisting of nickel, copper, titanium, silver, cadmium, gold, aluminum, tin, indium, iron, manganese, silicon, zinc, vanadium, molybdenum, niobium, rhenium, and uranium.

3. The method according to claim 1, wherein
   said protective coating is selected from the group consisting of rhenium, platinum, palladium iridium, rhodium, ruthenium, and gold.

4. The method according to claim 1, comprising the further step of
   while subjecting the plated and coated form to said temperature gradient, constantly kneading the plated and coated form to facilitate homogenization and thermal diffusion of said plated alloying agent throughout the form.

5. The method according to claim 4, wherein
   said step of constantly kneading said plated and coated form comprises repeated minor deformation of the form in a rhythmic fashion.

6. The method according to claim 4, wherein
   said step of constantly kneading said plated and coated form comprises rolling said plated and coated form between rollers.

7. The method according to claim 4, wherein
   said step of constantly kneading said plated and coated form comprises contorting said plated and coated form with an electromagnetic field.

8. The method according to claim 1, comprising the further steps of
   determining and controlling the amount of metal of said alloying agent deposited on said form through out said plating step.

9. A post-production method for modification and enhancement of pre-existing shape memory alloy (SMA) forms to precisely alter their chemical composition and produce desired shape memory characteristics, comprising the steps of:
   introducing an effective amount of radioactive material into a selected alloying agent sufficient to function as a tracer element;
   plating the surface of a pre-existing shape memory alloy (SMA) form with a precise amount of said selected alloying agent to produce a desired shape memory characteristic;
   utilizing neutron tracer analysis to determine and control the amount of metal of said alloying agent deposited on said form through out said plating step and
   applying a protective coating on said plated form to prevent corrosion and contamination and undesirable diffusion at high temperatures.

10. The method according to claim 9, wherein
    said radioactive material comprises a radioisotope that corresponds to stable metal being coated.

11. The method according to claim 9, comprising the further step of
    determining the activity of said radioactive material and the time interval since said form was plated to ascertain the effective mass of said alloying agent deposited on said form.

12. The method according to claim 11, wherein
    said step of determining the activity of said radioactive material is accomplished by spectroscopy selected from the group consisting of gamma and beta spectroscopy.

13. The method according to claim 9, wherein
    said step of utilizing neutron tracer analysis to determine and control the amount of metal of said alloying agent deposited on said form through out said plating step includes:
    providing a reservoir of a dilute aqueous radioisotope parent solution;
    exposing said reservoir to an uninterrupted uniform neutron flux for an effective amount of time sufficient to cause the activity of the daughter radioisotope of the radioisotope parent to remain substantially constant;
    taping said reservoir with a metered pump to replenish said daughter radioisotope in the alloying agent plating bath;

monitoring the specific activity and total metal content of the plating bath; and determining the activity plated on said form and relating it to the total metal plated.

14. A method for modification and enhancement of pre-existing alloy forms to precisely alter their chemical composition and produce desired shape memory characteristics, comprising the steps of:

plating the surface of a pre-existing alloy form with a precise amount of a selected alloying agent to produce a desired shape memory characteristic;

applying a protective coating on the plated form to prevent corrosion and contamination and undesirable diffusion at high temperatures;

subjecting said plated and coated form to a thermal diffusion process; and constantly kneading the plated and coated form during the thermal diffusion process to facilitate homogenization and thermal diffusion of said plated alloying agent throughout the form.

* * * * *